July 3, 1934.  W. C. WALKER  1,965,207
HOSE CLAMP
Filed June 5, 1933
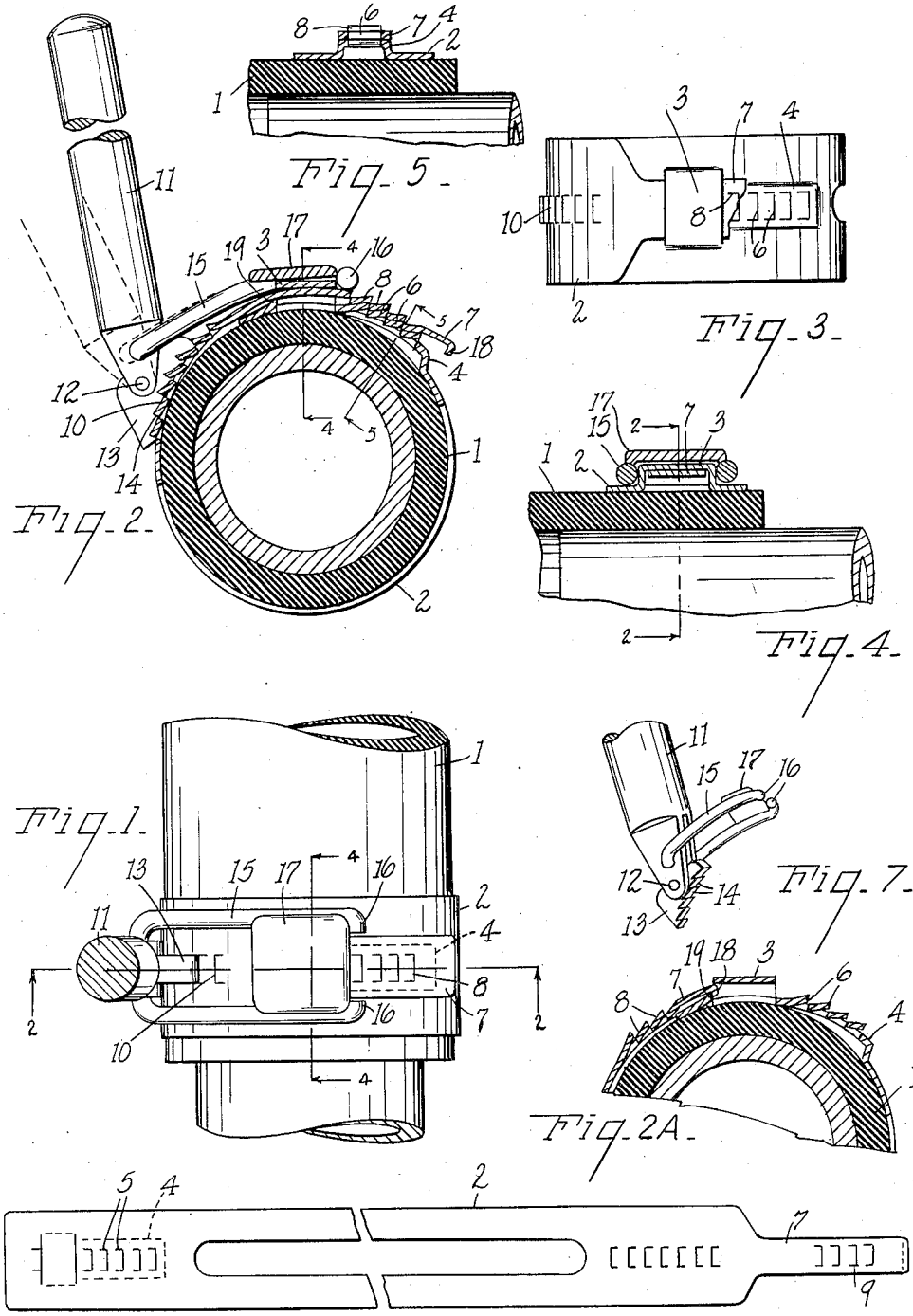
INVENTOR
Ward C. Walker
BY
Chappell Earl
ATTORNEYS Patented July 3, 1934

1,965,207

UNITED STATES PATENT OFFICE 1,965,207

HOSE CLAMP

Ward C. Walker, Battle Creek, Mich.

Application June 5, 1933, Serial No. 674,287

10 Claims. (Cl. 24—20)

The main object of this invention is to provide an improved hose clamp formed of a single piece of sheet metal which may be very economically produced, is quickly and easily applied, and may be drawn very tightly upon the work.

A further object is to provide a tool facilitating the application of the clamp and which enables its being drawn very firmly upon the work.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary side view of a section of hose with my improved clamp applied thereto, illustrating the method of application. I have not in the accompanying drawing attempted to show the part to which the hose is attached.

Fig. 2 is a detail view mainly in section on a line corresponding to line 2—2 of Figs. 1 and 4.

Fig. 2A is a fragmentary section illustrating an initial positioning of the clamp on the work.

Fig. 3 is a fragmentary side elevation of the clamp.

Fig. 4 is a fragmentary section on a line corresponding to line 4—4 of Figs. 1 and 2.

Fig. 5 is a detail section on line 5—5 of Fig. 2.

Fig. 6 is a fragmentary plan view of the clamp in the flat and partially blanked out.

Fig. 7 is a fragmentary perspective view of the adjusting tool.

In the accompanying drawing 1 represents a piece of hose. My improved hose clamp is formed of a single piece of sheet metal and consists of a band-like body portion 2 having a loop 3 struck up therefrom adjacent one end and a longitudinal cammed ratchet-toothed rib 4 at the inner side of the loop in alinement therewith. These teeth are formed by forming U-shaped slits 5 in the band and deflecting the metal to provide the ratchet teeth 6. At its opposite end the band is provided with a tongue 7 adapted to be inserted through the loop and having a series of ratchet teeth 8 cooperating with the ratchet teeth 6 when the tongue is inserted under the loop. These ratchet teeth 8 are also formed by forming U-shaped slits 9 in the tongue and deflecting or distorting the edges thereof to correspond with the teeth 6 and so that when the tongue is engaged there is a series of co-engaging teeth. The band is also provided with a series of oppositely facing ratchet teeth 10 adjacent its tongue, that is, the teeth 10 face outwardly while the teeth 8 face inwardly.

To facilitate application of the band and drawing it up or clamping upon the work, I provide a tool consisting of a handle or lever 11 pivoted at 12 on the block 13 having ratchet teeth 14 engageable with the ratchet teeth 10 of the clamp. A link 15 is pivoted on the lever adjacent the pivot 12 and is provided with inwardly turned lugs 16 engageable with the loop. A finger piece 17 is provided at the outer end of the link so that it may be held down upon the loop while the handle is manipulated to ratchet the tongue forwardly through the loop and draw the clamp tightly upon the hose.

The teeth 6 are preferably formed on the cammed rib portion 4 as this renders more positive the ratchet engagement of the teeth of the tongue with the teeth on the band at the inner side of the loop. However, the engagement may be easily effected when the rib is omitted.

To hold the clamp in circular form and also to facilitate positioning to receive the tool, the tongue terminates in an inturned lug 18 adapted to engage the upturned tooth-like keeper portion 19 formed on the inner edge of that portion of the band lying in front of the loop, see Fig. 2A. With the parts arranged as shown in Fig. 2A the tool may be used to manipulate and draw up the band, the tongue having its initial start under the loop and being held in that position by its engagement over the tooth or keeper 19.

My improved clamp may be very economically produced and is, as stated, very easily applied. The tool illustrated is well adapted and especially designed by me for the work, and enables very rapid application of the clamps and they may be drawn very tightly on the work.

Having thus described my invention what I claim as new and desire to secure by Letters Patent is:

1. A hose clamp formed of a single piece of sheet metal consisting of a band portion having a loop struck outwardly therefrom adjacent one end and a longitudinally cammed ratchet toothed rib struck up at the inner side of the loop and in alinement therewith, there being a tongue at the opposite end of the band insertable through said loop and having a series of ratchet teeth engageable with the ratchet teeth on said band when the tongue is disposed through the loop, the tongue terminating in an inwardly directed lug engageable with the inner edge of the portion of the band lying in front of said loop, such inner edge being deflected upwardly, said band having adjacent the tongue a series of tool engaging ratchet teeth and facing away from the tongue to facilitate the application of a clamp by means of a tool engaging the loop and the said tool-engaging ratchet teeth.

2. A hose clamp formed of a single piece of sheet metal consisting of a band portion having a loop struck outwardly therefrom adjacent one end and a longitudinally cammed ratchet toothed rib struck up at the inner side of the loop and in alinement therewith, there being a tongue at the opposite end of the band insertable through said loop and having a series of ratchet teeth engageable with the ratchet teeth on said band when the tongue is disposed through the loop, said band having adjacent the tongue a series of tool engaging ratchet teeth and facing away from the tongue to facilitate the application of a clamp by means of a tool engaging the loop and the said tool engaging ratchet teeth.

3. A hose clamp formed of a single piece of sheet metal consisting of a band portion having a loop struck outwardly therefrom adjacent one end and a longitudinally cammed ratchet toothed rib struck up at the inner side of the loop and in alinement therewith, there being a tongue at the opposite end of the band insertable through said loop and having a series of ratchet teeth engageable with the ratchet teeth on said band when the tongue is disposed through the loop, the tongue terminating in an upwardly directed lug engageable with the inner edge of the portion of the band lying in front of said loop, such inner edge being deflected upwardly.

4. A hose clamp formed of a single piece of sheet metal consisting of a band portion having a loop struck outwardly therefrom adjacent one end, the ends of said loop being open, and a longitudinally cammed ratchet toothed rib struck up in said band portion at the inner side of the loop and in alinement therewith, there being a tongue at the opposite end of the band insertable through said loop and having a series of ratchet teeth engageable with the ratchet teeth on said band when the tongue is disposed through the loop.

5. A hose clamp formed of a single piece of sheet metal consisting of a band portion having a loop struck outwardly therefrom adjacent one end and ratchet teeth at the inner side of the loop, there being a tongue at the opposite end of the band insertable through said loop and having a series of ratchet teeth engageable with the ratchet teeth on said band when the tongue is disposed through the loop, the tongue terminating in an upwardly directed lug engageable with the inner edge of the portion of the band lying in front of said loop, such inner edge being deflected upwardly, said band having adjacent the tongue a series of tool engaging ratchet teeth and facing away from the tongue to facilitate the application of a clamp by means of a tool engaging the loop and the said tool engaging ratchet teeth.

6. A hose clamp formed of a single piece of sheet metal consisting of a band portion having a loop struck outwardly therefrom adjacent one end and ratchet teeth at the inner side of the loop, there being a tongue at the opposite end of the band insertable through said loop and having a series of ratchet teeth engageable with the ratchet teeth on said band when the tongue is disposed through the loop, said band having adjacent the tongue a series of tool engaging ratchet teeth and facing away from the tongue to facilitate the application of a clamp by means of a tool engaging the loop and the said tool engaging ratchet teeth.

7. A hose clamp formed of a single piece of sheet metal consisting of a band portion having a loop struck outwardly therefrom adjacent one end, the ends of said loop being open and ratchet teeth in said band portion at the inner side of the loop, there being a tongue at the opposite end of the band insertable through said loop and having a series of ratchet teeth engageable with the ratchet teeth on said band when the tongue is disposed through the loop, the tongue terminating in an inwardly directed lug engageable with the inner edge of the portion of the band lying in front of said loop, such inner edge being deflected upwardly.

8. A hose clamp formed of a single piece of sheet metal consisting of a band portion having a loop struck outwardly therefrom adjacent one end, the ends of said loop being open, and ratchet teeth in said band portion at the inner side of the loop, there being a tongue at the opposite end of the band insertable through said loop and having a series of ratchet teeth engageable with the ratchet teeth on said band when the tongue is disposed through the loop.

9. A hose clamp formed of a single piece consisting of a band portion having spaced outwardly projecting flanges forming a channel adjacent one end and a series of longitudinally cammed ratchet teeth struck up in the web at the inside of the channel and in alinement therewith, there being a tongue at the opposite end of the band portion insertable through said channel in overlapping relation with said web at the inside of the channel and having a series of longitudinally cammed ratchet teeth engageable with the ratchet teeth in said channel when the tongue is disposed therein, said band having adjacent the tongue a series of tool engaging ratchet teeth and facing away from the tongue to facilitate the application of a clamp by means of a tool engaging the flanges and said tool engaging ratchet teeth.

10. A hose clamp formed of a single piece consisting of a band portion having spaced flanges forming a channel adjacent one end and a series of longitudinally cammed ratchet teeth struck up in the web at the inside of the channel and in alinement therewith, there being a tongue at the opposite end of the band portion insertable through said channel in overlapping relation with said web at the inside of the channel and having a series of longitudinally cammed ratchet teeth engageable with the ratchet teeth in said channel when the tongue is disposed therein.

WARD C. WALKER.